United States Patent [19]

Patermaster

[11] Patent Number: 5,337,263

[45] Date of Patent: Aug. 9, 1994

[54] SIMPLIFIED CHECKBOOK BALANCING COMPUTER SYSTEM

[76] Inventor: John J. Patermaster, 4910 W. Chalk Point Rd., West River, Md. 20778

[21] Appl. No.: 76,835

[22] Filed: Jun. 15, 1993

[51] Int. Cl.⁵ .................. G06F 13/00; G06F 15/30
[52] U.S. Cl. .................. 564/705.02; 235/380
[58] Field of Search ............ 364/705.02, 401, 406; 235/380

[56] References Cited

U.S. PATENT DOCUMENTS

| | | | |
|---|---|---|---|
| 4,222,109 | 9/1980 | Siwula | 364/705.02 |
| 4,417,136 | 11/1983 | Rushby et al. | 235/379 |
| 4,623,965 | 11/1986 | Wing | 364/705.02 |
| 4,724,527 | 2/1988 | Nishimura et al. | 364/705.02 |
| 4,737,911 | 4/1988 | Freeman, Jr. | 364/705.02 |
| 4,825,051 | 4/1989 | Kawai et al. | 364/408 |
| 4,866,611 | 9/1989 | Cree et al. | 364/705.08 |
| 4,910,696 | 3/1990 | Grossman et al. | 364/705.02 |
| 5,063,600 | 11/1991 | Norwood | 364/705.06 X |
| 5,093,787 | 3/1992 | Simmons | 364/705.02 |
| 5,109,354 | 4/1992 | Yamashita et al. | 364/708.1 |
| 5,134,564 | 7/1992 | Dunn et al. | 364/406 |
| 5,193,055 | 3/1993 | Brown et al. | 364/406 |
| 5,221,838 | 6/1993 | Gutman et al. | 235/380 X |
| 5,233,547 | 8/1993 | Kapp et al. | 364/705.02 |
| 5,258,935 | 11/1993 | Ure | 364/705.02 |

OTHER PUBLICATIONS

Introducing Checkright ™ money manager ™, 2 pages, by ReboSo, Inc. 1990.
Matthews, "Excel 4 for Windows Made Easy", Osborne McGraw-Hill, 1992, pp. 56–58.
Instructions from Maryland National Bank on Balancing Your Checkbook, Aug. 1992.
Instructions from American Security Bank on Balancing Your Checkbook, Jan. 1992.
Instructions from Sovran Financial Corporation on Balancing Your Checkbook, May 1990.
Instructions from Maryland Federal on Balancing Your Checkbook, Apr. 1993.

*Primary Examiner*—Tan V. Mai
*Attorney, Agent, or Firm*—Oblon, Spivak, McClelland, Maier & Neustadt

[57] ABSTRACT

A checkbook balancing system in which the user does not have to enter each checking transaction into the system but only transactions which bring the checkbook in line with the bank statement and vice versa. The display of the system is divided into two halves. One half is for adjustments to the bank balance and contains information appearing in the checkbook but not on the bank statement. The other half is for adjustments to the checkbook and contains items appearing in the bank statement but not in the checkbook. Further, the halves can be divided into quarters or quadrants. Quadrant (A) contains checks which were written but not paid by the bank. Quadrant (B) contains deposits and other adjustments appearing in the checkbook but not in the bank statement. Quadrant (C) contains bank charges and adjustments appearing on the bank statement but not in the checkbook. Quadrant (D) contains bank credits and adjustments appearing on the bank statement but not in the checkbook. Accordingly, a user of the checkbook balancing system need not enter every transaction of the checking account but only transactions which are used to account for differences between the bank statement and checkbook.

9 Claims, 18 Drawing Sheets

| QUADRANT (A) | | QUADRANT (C) | |
|---|---|---|---|
| BANK BAL, 12/31/92 | 785.20 | CKBK BAL, CHECK 500 | 1000.00 |
| LESS: UNPAID CHECK NO. 492 | 37.00 | LESS: BANK CHARGES AND ADJUSTMENTS | 5.75 |
| QUADRANT (B) | | QUADRANT (D) | |
| PLUS: OUTSTANDING DEPOSIT NOT ON BANK STMT | 250.00 | PLUS: BANK CREDITS AND ADJUSTMENTS | 3.95 |
| ACTUAL BANK BALANCE | 998.20 | ACTUAL CKBK BALANCE | 998.20 |

BASIC SCREEN NO.1
PRIOR BALANCING FOR MONTH OF [SEP 92]

| QUADRANT (A) | QUADRANT (C) |
|---|---|
| BANK BAL [09/30/92] [ 521.65] | CKBK BAL [ 414.31]<br>CHECK [ 5647] |
| LESS: UNPAID CHECKS:<br>NO.        AMOUNT<br>[ 5321]  [ 20.00]<br>[ 5630]  [ 20.00]<br>[ 5641]  [ 30.00]<br>[SCR 2 ] [ 42.49]<br>TOT UPD CKS        112.49 | LESS: BK CHGS & ADJ:<br>ITEM     AMOUNT<br>[SVC CHG] [ 8.50]<br>[       ] [      ]<br>[       ] [      ]<br>[SCR 3  ] [ 0.00]<br>TOT BK CHGS & ADJ    8.50 |
| SUBTOTAL           409.16 | SUBTOTAL           405.81 |
| QUADRANT (B) | QUADRANT (D) |
| ADD: OUTSTANDING DEPOSITS<br>NOT ON STMT, & ADJ:<br>DATE      AMOUNT<br>[       ] [      ]<br>[       ] [      ]<br>[       ] [      ]<br>[SCR 3 ] [ 0.00]<br>TOT OUT DEP & ADJ   0.00 | ADD: BK CR & ADJ:<br>ITEM      AMOUNT<br>[INT CR ] [ 3.35]<br>[       ] [      ]<br>[       ] [      ]<br>[SCR 3  ] [ 0.00]<br>TOT BK CR & ADJ     3.35 |
| ACTUAL BK BAL      409.16 | ACTUAL CKBK BAL    409.16 |

FIG. 5

PRIOR BALANCING FOR MONTH OF [SEP 92]        (OPTIONAL SCREEN NO. 2)

ADDITIONAL UNPAID CHECKS/NOTES

| (1) CHECK NO. | (2) AMOUNT | (3) CHECK NO. | (4) AMOUNT |
|---|---|---|---|
| [ 5645 ] | [ 19.41 ] | [     ] | [     ] |
| [ 5646 ] | [ 23.08 ] | [     ] | [     ] |
| [     ] | [     ] | [     ] | [     ] |
| [     ] | [     ] | [     ] | [     ] |
| [     ] | [     ] | [     ] | [     ] |
| [     ] | [     ] | [     ] | [     ] |

[NOTE: CHECK NO. 5632 WAS VOIDED]

| [     ] | [     ] | [     ] | [     ] |
| [     ] | [     ] | [     ] | [     ] |

TOTAL TO SCREEN NO. 1, QUADRANT (A)  $  42.49

FIG. 6

PRIOR BALANCING FOR MONTH OF [SEP 92]   (OPTIONAL SCREEN NO.3)
ADDITIONAL OUTSTANDING DEPOSITS, BANK CHARGES,
BANK CREDITS AND CHECKBOOK ADJUSTMENTS

| (1) DATE | (2) ITEM/ADJUSTMENT | (3) AMOUNT | (4) QUADRANT |
|---|---|---|---|
| [ ] | [ ] | | [ ] |
| ... | ... | ... | ... |

TOTAL TO SCR 1, QUADRANT (B) $......
TOTAL TO SCR 1, QUADRANT (C) $......
TOTAL TO SCR 1, QUADRANT (D) $......

FIG. 7

BASIC SCREEN NO.4
CURRENT BALANCING FOR MONTH OF [OCT 92]

| QUADRANT (A) | | QUADRANT (C) | |
|---|---|---|---|
| BANK BAL [10/31/92] | [ 1095.56] | CKBK BAL<br>CHECK [ 5668] | [ 1081.87] |
| LESS: UNPAID CHECKS:<br>NO.         AMOUNT<br>[ 5321] [ 20.00]<br>[     ] [     ]<br>[     ] [     ]<br>[SCR 5 ] [ 0.00]<br>TOT UPD CKS | 20.00 | LESS: BK CHGS & ADJ:<br>ITEM         AMOUNT<br>[SVC CHG] [ 8.50]<br>[ATM CHG] [ 2.00]<br>[       ] [     ]<br>[SCR 6  ] [ 0.00]<br>TOT SVC CHGS & ADJ | 10.50 |
| SUBTOTAL | 1075.56 | SUBTOTAL | 1071.37 |
| QUADRANT (B) | | QUADRANT (D) | |
| ADD: OUTSTANDING DEPOSITS<br>NOT ON STMT, & ADJ:<br>DATE        AMOUNT<br>[     ] [     ]<br>[     ] [     ]<br>[     ] [     ]<br>[SCR 6 ] [ 0.00]<br>TOT OUT DEP & ADJ | 0.00 | ADD: BK CR & ADJ:<br>ITEM         AMOUNT<br>[INT CR ] [ 3.59]<br>[BK ERR ] [ .60]<br>[       ] [     ]<br>[SCR 6  ] [ 0.00]<br>TOT BK CR & ADJ | 4.19 |
| ACTUAL BK BAL | 1075.56 | ACTUAL CKBK BAL | 1075.56 |

FIG. 8

CURRENT BALANCING FOR MONTH OF [OCT 92]        (OPTIONAL SCREEN NO. 5)

ADDITIONAL UNPAID CHECKS/NOTES

| (1) CHECK NO. | (2) AMOUNT | (3) CHECK NO. | (4) AMOUNT |
|---|---|---|---|
| ☐☐☐☐ | ☐☐☐☐☐ | ☐☐☐☐ | ☐☐☐☐☐ |
| ☐☐☐☐ | ☐☐☐☐☐ | ☐☐☐☐ | ☐☐☐☐☐ |
| ☐☐☐☐ | ☐☐☐☐☐ | ☐☐☐☐ | ☐☐☐☐☐ |
| ☐☐☐☐ | ☐☐☐☐☐ | ☐☐☐☐ | ☐☐☐☐☐ |
| ☐☐☐☐ | ☐☐☐☐☐ | ☐☐☐☐ | ☐☐☐☐☐ |

[NO ADDITIONAL UNPAID CHECKS THIS MONTH]

| ☐ | ☐☐ | ☐ | ☐☐ |
| ☐ | ☐☐ | ☐ | ☐☐ |

TOTAL TO SCREEN NO. 4, QUADRANT (A) $ 0.00

*FIG. 9*

CURRENT BALANCING FOR MONTH OF [OCT 92]     (OPTIONAL SCREEN NO. 6)
ADDITIONAL OUTSTANDING DEPOSITS, BANK CHARGES,
BANK CREDITS AND CHECKBOOK ADJUSTMENTS

| (1) DATE | (2) ITEM/ADJUSTMENT | (3) AMOUNT | (4) QUADRANT |
|---|---|---|---|
| [____] | [_____] | [_____] $........ | [_____] |
| | TOTAL TO SCR 4, QUADRANT (B) | $........ | |
| | TOTAL TO SCR 4, QUADRANT (C) | $........ | |
| | TOTAL TO SCR 4, QUADRANT (D) | | |

*FIG. 10*

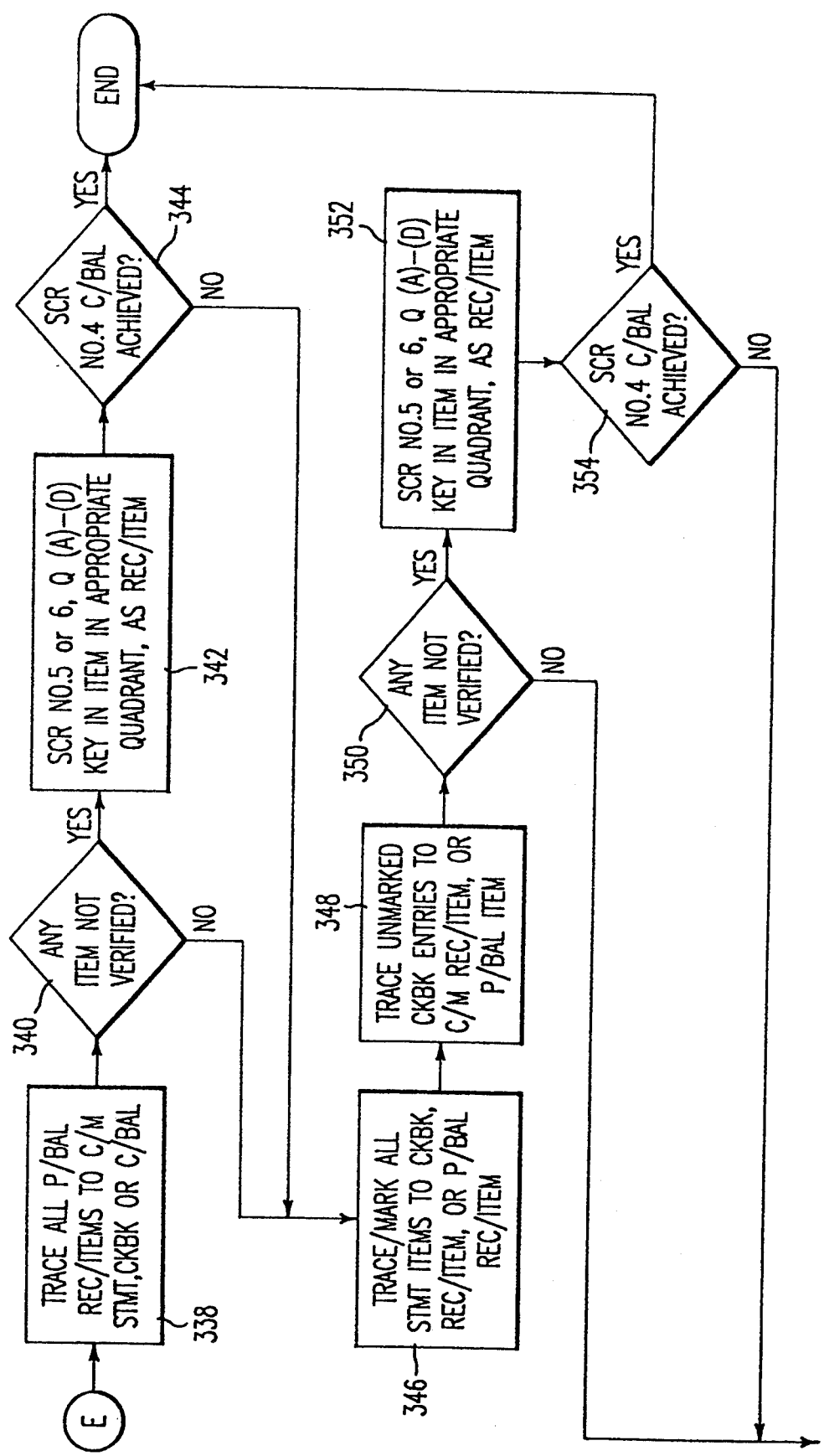
FIG. 13B(1)

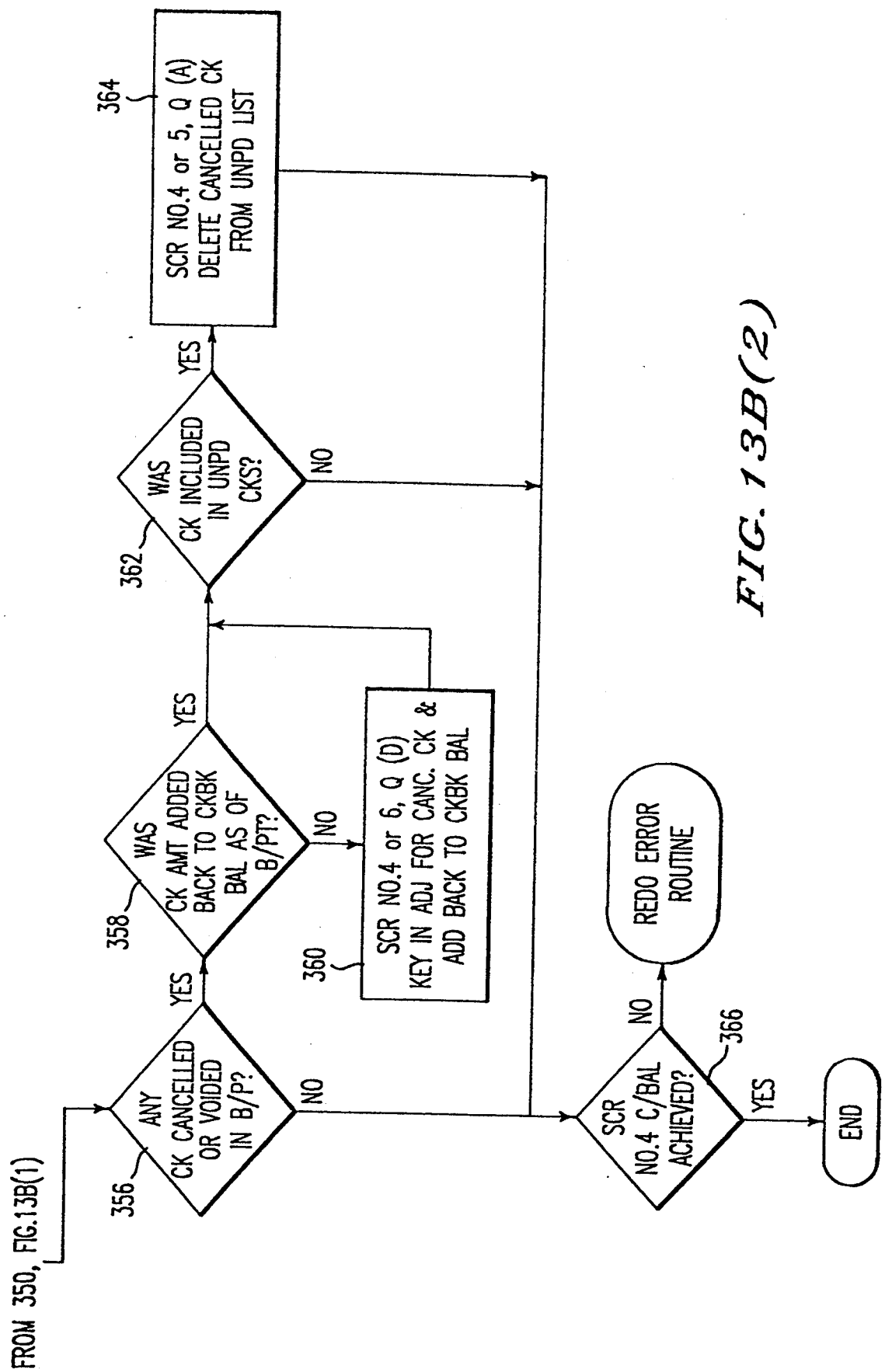
FIG. 13B(2)

SIMPLIFIED CHECKBOOK BALANCING COMPUTER SYSTEM

BACKGROUND OF THE INVENTION

1. Field of the Invention

The present invention is generally related to a computer for balancing a checkbook and more particularly, to a simplified system for balancing a checkbook in which it is not necessary for a user to enter each checking account transaction.

2. Discussion of the Background

Checkbook balancing, also called a bank reconciliation, is an agreement between two independent records (a checkbook and the bank's statement) as to the amount of money in an account at a given point in time, usually at month end. Normally, a monthend statement will be received within 10 days into the new month and should be balanced as soon as practicable to update the checkbook balance for bank charges and credits and to catch any errors that may have occurred in the checkbook or in bank transactions.

Bank statements are normally divided into three sections. First, a summary section is provided to show the overall status of the account, i.e., the beginning balance (also the last month's ending balance), total deposits and credits, total checks and debits, and the ending balance.

Second, the detailed section lists by date (the bank's entry date) each check/debit made, and each deposit/credit made to arrive at the ending balance. A relatively new third section provided for the account holder's benefit lists in numerical sequence, each check paid, with asterisks or other indicators showing breaks in the numerical sequence.

Each break may or may not indicate an unpaid check needed for balancing purposes. Other causes of breaks in the check sequence include a cancelled or voided check, an alteration in the sequence of checks used (i.e., using a new packet of checks out of sequence with prior ones), and particularly at the beginning of the listing, payment of a check written in a prior month followed by a check written in the current month. It is important to determine the cause of each break in numerical sequence since unpaid checks must become part of the balancing process.

A number of computerized accounting systems are available to consumers and commercial institutions. However, the systems are not intended simply for balancing a checkbook, but are full accounting or bookkeeping systems. These types of systems are available in software packages for use on personal computers. A popular accounting system for use on personal computers is "QUICKEN" by Intuit. However, a system such as QUICKEN requires a user to enter each check which has been written, each deposit, and all other transactions affecting the account in question. While these systems are beneficial to businesses which need computer records of all transactions and for certain individuals who desire a bookkeeping system to keep track of each transaction, the systems are not convenient for ordinary people.

For example, many checks are written by consumers during the normal course of the day (i.e., while they are away from home). It is therefore inconvenient for these people to write checks during the day and at the end of a day, enter all checks written, deposits, ATM transactions, etc. into a computer.

As an alternative, Siwla, U.S. Pat. No. 4,222,109, discloses an electronic checkbook which allows a user to keep track of checkbook transactions electronically, by a microprocessor system which is part of the checkbook. However, this system also requires a user to enter each transaction into the checkbook and these types of systems do not provide an easy method of balancing a checkbook. Additionally, many people do not completely trust computers to store important information and a user of the Siwla system would often keep a paper record of each checkbook transaction.

SUMMARY OF THE INVENTION

The present inventor has recognized that there has been a long-felt need for a simplified checkbook balancing system in which each transaction of a checking account does not have to be entered into the system. Accordingly, one object of this invention is to provide a novel simplified checkbook balancing computer system which does not require the entry of each checking account transaction.

It is a further object of this invention to provide a checkbook balancing system in which the display is divided into two main regions; one of the regions pertains to the bank balance and transactions which are recorded in the checkbook but the bank does not yet have a record of, and the other region pertains to the checkbook balance with subtractions and additions to the account which are recognized by the bank but not recorded in the checkbook.

It is yet a further object of this invention to divide each of the two regions of the display to obtain four quadrants. The first two quadrants pertain to the bank balance and the latter two quadrants pertain to the checkbook balance. The first quadrant pertains to unpaid checks, and the second quadrant pertains to outstanding deposits which the bank has not recognized. The third quadrant pertains to bank charges, and the fourth quadrant pertains to bank credits which the checkbook has not recognized.

These and other objects are accomplished by a simplified checkbook balancing system which allows a user to easily and rapidly balance a checkbook. The system is ideally contained in a handheld computer but can also be run on any other type of computer system.

A handheld system constructed in accordance with the present invention can include two sections attached by a hinge. The top section can be a display and the bottom section can be a keyboard for entering various information. The display can be broken up into four quadrants with quadrant (A) being the upper left hand corner, quadrant (B) being the lower left hand corner, quadrant (C) being the upper right hand corner and quadrant (D) being the lower right hand corner.

The process for balancing the checkbook has a user enter the bank statement balance at the end of the month into quadrant (A). The checkbook balance, after the last paid check, including any deposits or adjustments before the next check is entered in quadrant (C). Checks which have not been paid by the bank are entered in quadrant (A) and deposits which were made but not represented on the bank statement are entered in quadrant (B). All bank statement charges which are not recorded in the checkbook as of the balancing point are entered into quadrant (C) and interest or credits on the bank statement which do not appear in the checkbook before the balancing point is entered in quadrant (D). The actual bank balance and the actual checkbook balance are then calculated and should be equal to each other. If they are not, manual steps must be performed to determine where the error has occurred.

The use of the checkbook balance after the last paid check results in an efficiency all of its own, by reducing the number of unpaid checks to be carried in the balancing period.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 illustrates basic screen 1 for the prior month's balancing used as reference information to perform balancing for the current month;

FIG. 6 illustrates optional screen 2 for entering additional unpaid checks for the prior month's balancing;

FIG. 7 illustrates optional screen 3 which is used for additional outstanding deposits, bank charges, bank credits and checkbook adjustments for the prior month's balancing;

FIG. 8 illustrates basic screen 4 used for balancing the checkbook for the current month;

FIG. 9 illustrates optional screen 5 used for entering additional unpaid checks for the current month's balancing;

FIG. 10 illustrates optional screen 6 for entering additional outstanding deposits, bank charges, bank credits and checkbook adjustments for the current month's balancing;

FIGS. 13A, 13B(1) and 13B(2) illustrate a process for determining the source of error(s) and correction thereof when the actual bank balance and the actual checkbook balance are not the same.

DESCRIPTION OF THE PREFERRED EMBODIMENTS

Figure 1:
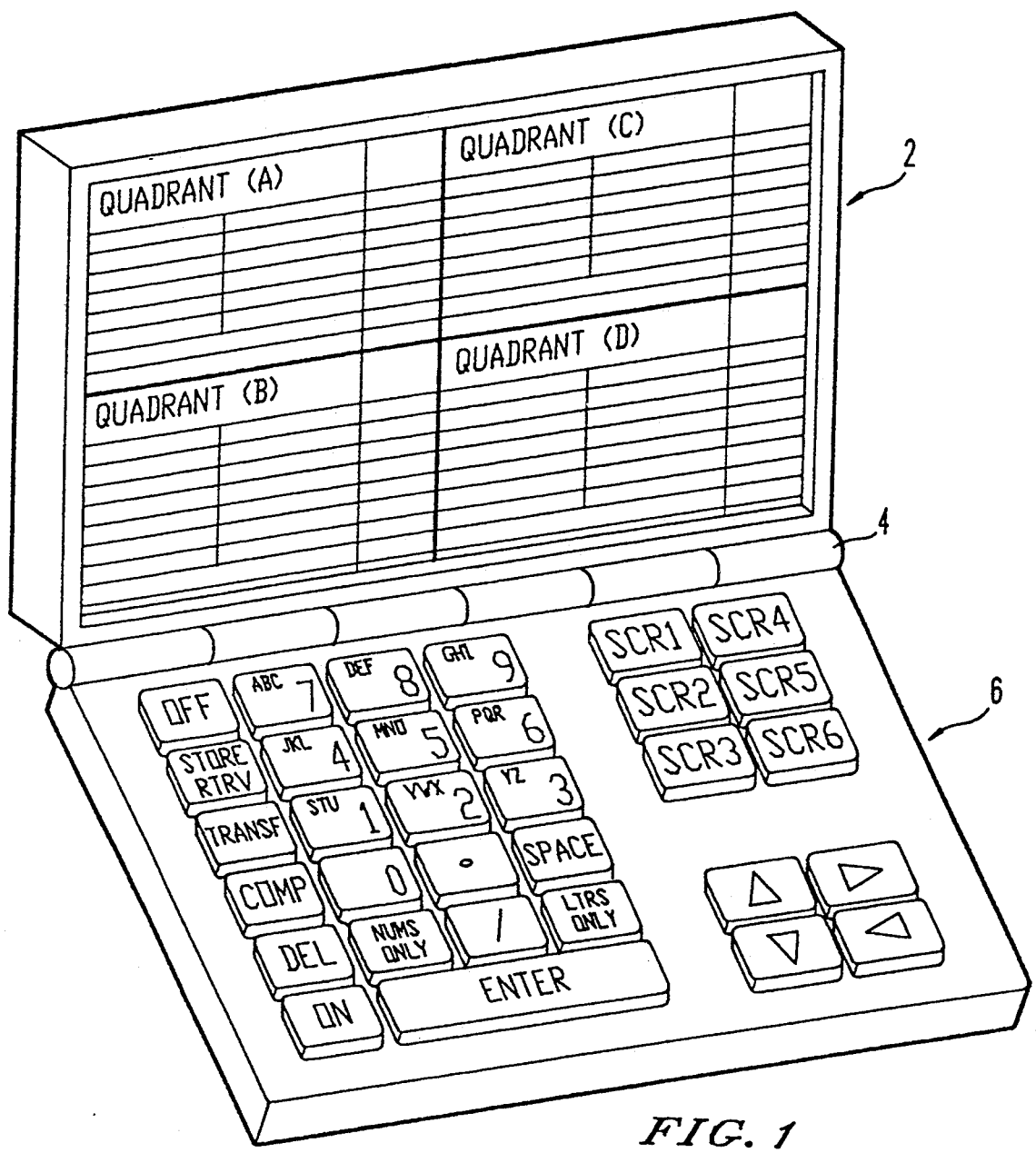
FIG. 1 illustrates the present invention embodied in a handheld calculating system.

Referring now to the drawings, wherein like reference numerals designate identical or corresponding parts throughout the several view, and more particularly to FIG. 1 thereof, there is illustrated a handheld computer constructed in accordance with the present invention. The computer includes a display 2 and a keyboard 6 connected by a hinge 4. The display 2 can be made from any known technology such as a liquid crystal display, light emitting diodes, a cathode ray tube, or any type of display suitable for use with a computer.

The keyboard 6 comprises keys used for entering the necessary financial information, transferring current month balancing to prior month screens, storing/retrieving data, and instructing the system to perform the balancing. The keyboard can be made using any type of known keyboard technology.

Figures 2, 3:
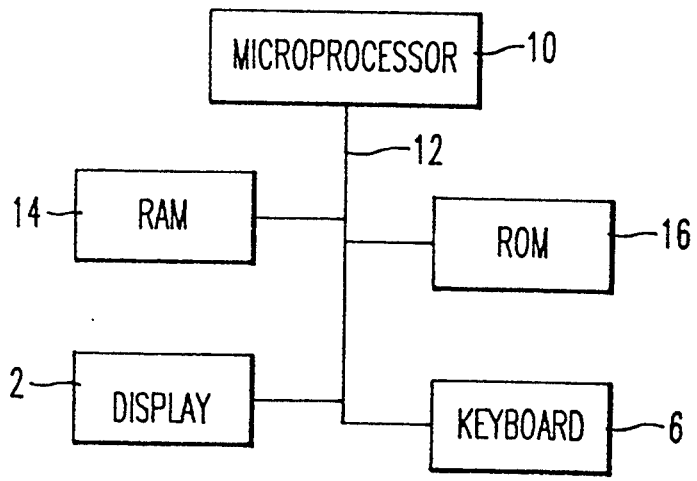
FIG. 2 is a simplified block diagram of the present invention.
FIG. 3 illustrates a simplified version of the information of each quadrant for explanatory purposes.

The system also comprises a computation section containing a microprocessor and other electronic components which are used to perform arithmetic operations and control the system. FIG. 2 illustrates a simplified block diagram of the components of the handheld computer illustrated in FIG. 1. A microprocessor 10 is connected to a system bus 12. Also connected to the bus 12 are a RAM 14 for storing system data, a ROM 16 for storing a program used by the system, the display 2 and the keyboard 6. Any type of known technology can be used to generate the displayed information, although the organization and layout of the display constitutes a part of the present invention.

It is desirable to have the information from the prior months and current month stored in the system so that when the computer is turned off, the information is not lost. In a handheld system, this information can be stored in the RAM 14 with a battery backup which does not lose information when the handheld computer is turned off. Also, any known type of storage device can be used to store the necessary data as an alternative to a RAM with battery backup. The program which controls the handheld computer is stored in any type of non-volatile memory such as the ROM 16. However, any other type of non-volatile memory can be used.

The present invention can also be embodied in any type of computer including a desk-top personal computer such as an IBM PC compatible. The computers in which the present invention can be embodied include existing hand held computers such as the Sharp Wizard ® or other type of handheld, notebook, portable, desk-top, or any other type of computer.

It is also possible to embody a process of the present invention in any type of non-volatile memory which can be used to program a computer. For example, a process of the invention can be embodied on a floppy disk which contains the necessary programs to operate a computer in accordance with the present invention. Other types of non-volatile memory which can be used to embody the present invention include ROMs, EEPROMs, magnetic cards, optical disks, or any other type of media suitable for storing a computer program.

FIG. 3 illustrates an exemplary way in which information can be organized for inputting and displaying data used when balancing a checkbook. As previously emphasized, the present invention is not directed towards a bookkeeping system or a system for keeping track of each transaction of a checking account, but its purpose is to provide a simplified way of balancing a checkbook.

A goal of checkbook balancing is to prove that, as of a particular point and time, the bank statement and checkbook have an equal balance when adjusted for reconciling items. The display is organized into two different sections; one section for handling balances and adjustments pertaining to the bank statement or bank balance, and another section relating to adjustments pertaining to the balance in the checkbook itself. The left side of FIG. 3 pertains to the bank balance and the right side pertains to the checkbook balance.

FIG. 3 can be thought of as a simplified way of displaying the equations used to balance a checkbook according to the present invention. The left side of FIG. 3 accounts for the bank balance and transactions that were already recognized in the checkbook but not in the bank statement; i.e., unpaid checks and outstanding deposits on the bank side. The right side of FIG. 3 represents the checkbook balance and the transactions which were recognized by the bank but not recorded in the checkbook, i.e., bank charges such as charges for the use of an automated teller machine ("ATM") or credits such as interest which had not yet been recorded in the checkbook. The organization of the display illustrated in FIG. 3 is very useful in providing a simple, clear and convenient way to input and display data.

The present invention is intended for the average person desiring to balance his/her checkbook in a more efficient manner. Its goal is to reduce the time and tedium for many of us who simply do not have the time (and patience) to devote to this task, and failing to do so, estimate our balance hoping not to write a bad check. Use of this system should cut the time for balancing a checkbook by about 40–50% by: a) eliminating the need for pencil and paper in most instances, b) eliminating the need to retrieve the prior month's statement and balancing (hard copy), and c) reducing the number of reconciling items.

To balance a checkbook, a specific point in time and point in the checkbook balance must be picked. Then, one must get the actual bank balance and the actual checkbook balance to be equal at this point. The ideal point of balancing a checkbook is the point at which the last check has been paid by the bank plus any adjustments or deposits recorded after the last check paid but before the next unpaid check of the checkbook. This materially reduces the reconciling items for unpaid checks not only in the current balancing, but also reduces the work for the succeeding balancing.

Turning to the specific numbers illustrated in FIG. 3 for a simple example of how the system of the present invention operates, it can be seen from quadrant (A) of FIG. 3 that the bank balance (i.e., the amount appearing on the bank statement), as of Dec. 31, 1992 was $785.20. A person would look at the bank statement (not illustrated) and see that the last check paid was check #500 and that the balance in the checkbook at this point in time was $1,000.00.

From a comparison of the bank statement with the checkbook, one would see that check No. 492 for $37.00 was not paid by the bank and this check would be entered in quadrant A. If the checkbook indicated that a deposit of $250.00 was made but this deposit did not yet appear on the bank statement, $250.00 would be entered in quadrant (B).

Bank charges and adjustments of $5.75 would be entered in quadrant (C) which include charges such as ATM fees and other bank fees which are not recorded in the checkbook. Quadrant (D) contains bank credits and adjustments such as interest of $3.95 which was not recorded in the checkbook as of the balancing point.

On the left side of FIG. 3, $785.20−$37.00+$250.00 is equal to the actual bank balance of the $998.20. On the right side of FIG. 3, the checkbook balance at the balancing point of $1,000.00 less the bank charges of $5.75 plus the bank credits which is interest of $3.95 is equal to the actual checkbook balance of $998.20.

A user of the system would see that the actual bank balance of $998.20 is equal to the actual checkbook balance of $998.20. Therefore, the checkbook is balanced for the month and no further action need be taken. If the bank balance and the checkbook balance were not equal, a user of the system would have to perform an error checking procedure which is described later.

Figure 4:
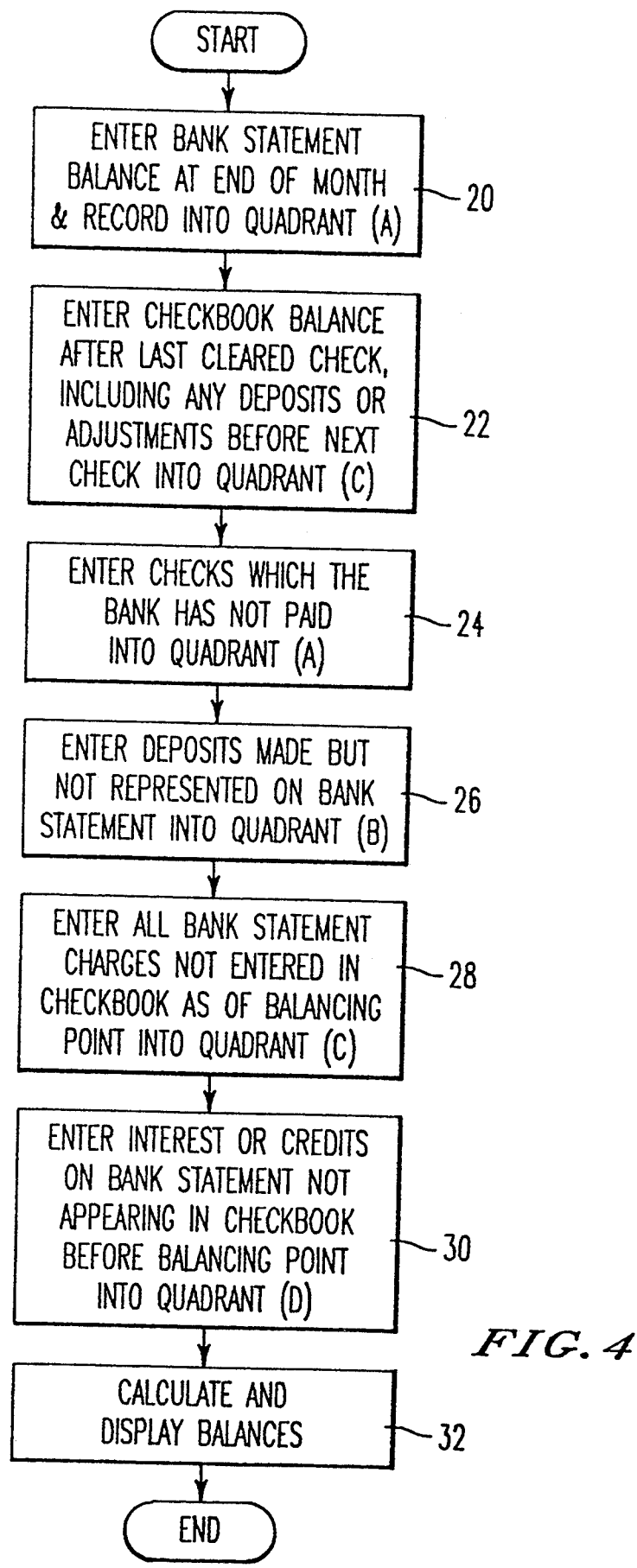
FIG. 4 is a simplified flow chart used to explain the process of the present invention.

FIG. 4 is a flowchart illustrating the process which has just been described with reference to FIG. 3. After starting, the bank statement balance is entered and recorded in quadrant (A) in step 20. Then, in step 22, a user finds the latest check paid by the bank from the numerical sequence listing at the end the bank statement. In the Example of FIG. 3, this check was found to be check No. 500. Also, as part of step 22, it was necessary to find the latest checkbook balance after the last check paid by the bank (No. 500, in this example), including any deposits or adjustments, but before entry of the next check (No. 501). This was found to be $1,000.00 as shown in quadrant (C) of FIG. 3. In the example of FIG. 3, the checkbook had a balance of $750 immediately after check No. 500. However, the checkbook also recorded a deposit of $250 prior to entry of check No. 501. Accordingly, at the balancing point the balance in the checkbook is $1,000 which is entered in quadrant (C) and could be indicated by a "BP" written in the checkbook by a user.

Next, in step 24, a user enters checks which have not been paid by the bank in quadrant (A). These checks are determined by comparing any unpaid checks from the prior month's balancing to the numerical sequence listing of paid checks in the bank statement to determine whether any of the outstanding checks from the previous month had been paid. If the listing does not show payment of an unpaid check from the prior month's balancing, the unpaid check should also be included in the current month's balancing in quadrant (A). After attending to unpaid checks from the prior month's balancing, each break in numerical sequence in the current month's statement resulting from unpaid checks must also be entered in quadrant (A).

Next, in step 26, deposits which have been made but not represented on the bank statement are entered in quadrant (B).

Next, step 28 has the user enter all bank statement charges not entered in the checkbook, as of the balancing point, into quadrant (C).

The last entry step, 30, has a user enter in quadrant (D), interest or credits which are on the bank statement but not in the checkbook as of the balancing point. This could include, for example, interest of $3.95 as illustrated in FIG. 3. The entries in quadrants (C) and (D), while not in the checkbook as of the balancing point, should be entered into the checkbook as soon as possible after balancing to avoid having these entries being carried forward to the succeeding month's balancing.

Last, step 32 calculates and displays the balances of the bank side and the checkbook side of the equation. For example, the actual bank balance is $998.20 which is equal to $785.20−$37.00+$250.00. The actual checkbook balance is also $998.20 which equals $1,000.00−$5.75+$3.95. As the actual bank balance equals the actual checkbook balance, the checkbook balancing procedure has ended and there is no need for any further steps. However, if the actual bank balance and the actual checkbook balance are not equal, further steps, as will be described later, must be taken to find the reason why the checkbook does not balance.

The particular balance and date, signified by the related transaction, at which the checkbook is balanced is called the balancing point. Although there may be several days between the checkbook balancing point (date) and the bank's statement date, balancing as of the last check paid on the bank statement better equates the checkbook with the bank statement. This is due to the time lag in payment of checks. This method cuts major time and effort in listing month after month, the additional unpaid checks issued up to the bank statement date, and subsequently checking for their payment in the succeeding month. For most people who simply want to assure the accuracy of their checkbook balance, it is unnecessary to balance the checkbook exactly at month's end. Nonetheless, for those desiring to balance at month's end, provision is made in the system for listing a total of 23 unpaid checks. Further, other convenient balancing points could be selected by a user to balance the checkbook.

The system of the present invention has a total of six screens; three of which are for the prior month's balancing, and three for the current month's balancing, as illustrated in FIGS. 5–10. Suppose that the present time is at the beginning of November, the current month that a person would be balancing is October and the prior month is September. Without needing to retrieve the actual prior month's bank statement and balancing hard copy, a user could access screens No. 1 and 2 of the prior month's balancing to determine, for example, which checks were written in September, or other prior months, and still have not cleared as of October 31. The prior month's balancing uses screens no. 1, 2 and 3, illustrated in FIGS. 5, 6 and 7 respectively, and the screens for the current month's balancing are screens no. 4, 5 and 6 illustrated in FIGS. 8, 9 and 10 respectively.

The first screen for the prior month's balancing and the current month's balancing (screens no. 1 and no. 4) are the basic balancing screens containing the quadrants needed for balancing as previously discussed with references to FIGS. 3 and 4.

Optional screens no. 2 and screen no. 5, illustrated in FIGS. 6 and 9 are used for entering checks in excess of 3 which have not yet cleared.

Optional screens no. 3 and 6, illustrated in FIGS. 7 and 10 respectively, are for additional outstanding deposits, bank charges, bank credits and checkbook adjustments which affect quadrants (B), (C), and (D) of their respective basic screens. These optional screens generate three separate monetary totals in support of quadrants (B), (C)and (D), of their respective basic screens which are limited to three entries.

Brackets within each of the screens (both basic and optional screens) indicate places where entries should be made, or left blank, if no entry is needed. However, optional screens may also be used for notes if space permits. Often a note is helpful in explaining an unusual adjustment or as a reminder for the next balancing.

The function of screens 1, 2, 4 and 5 are evident from the above explanations, the explanations of the flowcharts illustrated in FIGS. 11A–13B(2), set forth later, and from the illustrations themselves. However, screens 3 and 6 deserve further explanation.

Each of optional screens no. 3 and 6 is limited to 15 additional entries beyond the nine accommodated in quadrants (B), (C) and (D) of basic screens no. 1 and 4. To be automatically totaled and carried to the appropriate quadrant of screen no. 1 or 4, entries in columns (1) and (3) must be numerical and column (4) must contain one of the letters B, C or D to indicate which quadrant the entry is for. If desired, if a user has many entries for optional screens 3 or 6 which are more than the number of entries which can be displayed on the screen, a user may previously total these entries and enter this total as one entry into the system.

In the preferred embodiment of the present invention, the user will manually select which screen of the six screens is being displayed. In this manner, the user can quickly enter data as the user desires. However, as an alternative, the system can be automated so that the user will not have to worry about which screen to select but the system will ask appropriate questions, and answers by the user will automatically cause the display of the proper screens.

Figure 11A:
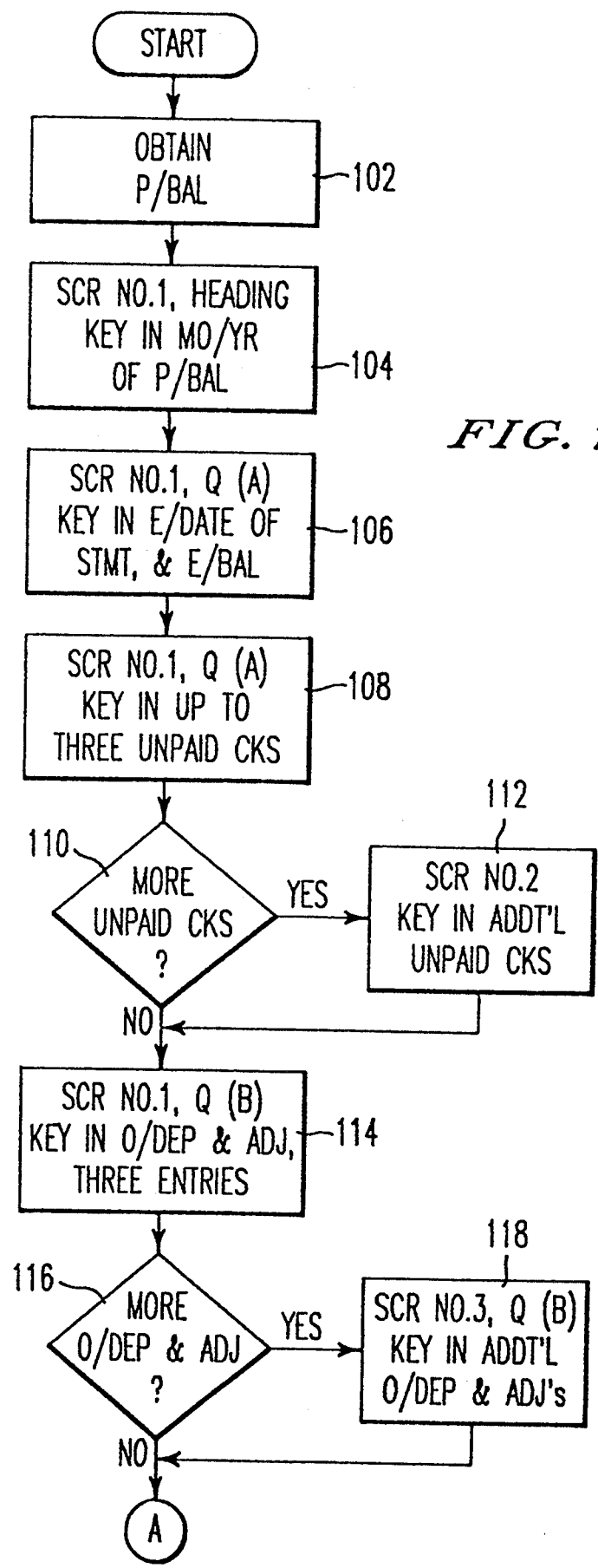
FIGS. 11A and 11B illustrate a process used for one-time only loading of the user's own prior month's balancing, either manual or computerized.
Figure 11B:
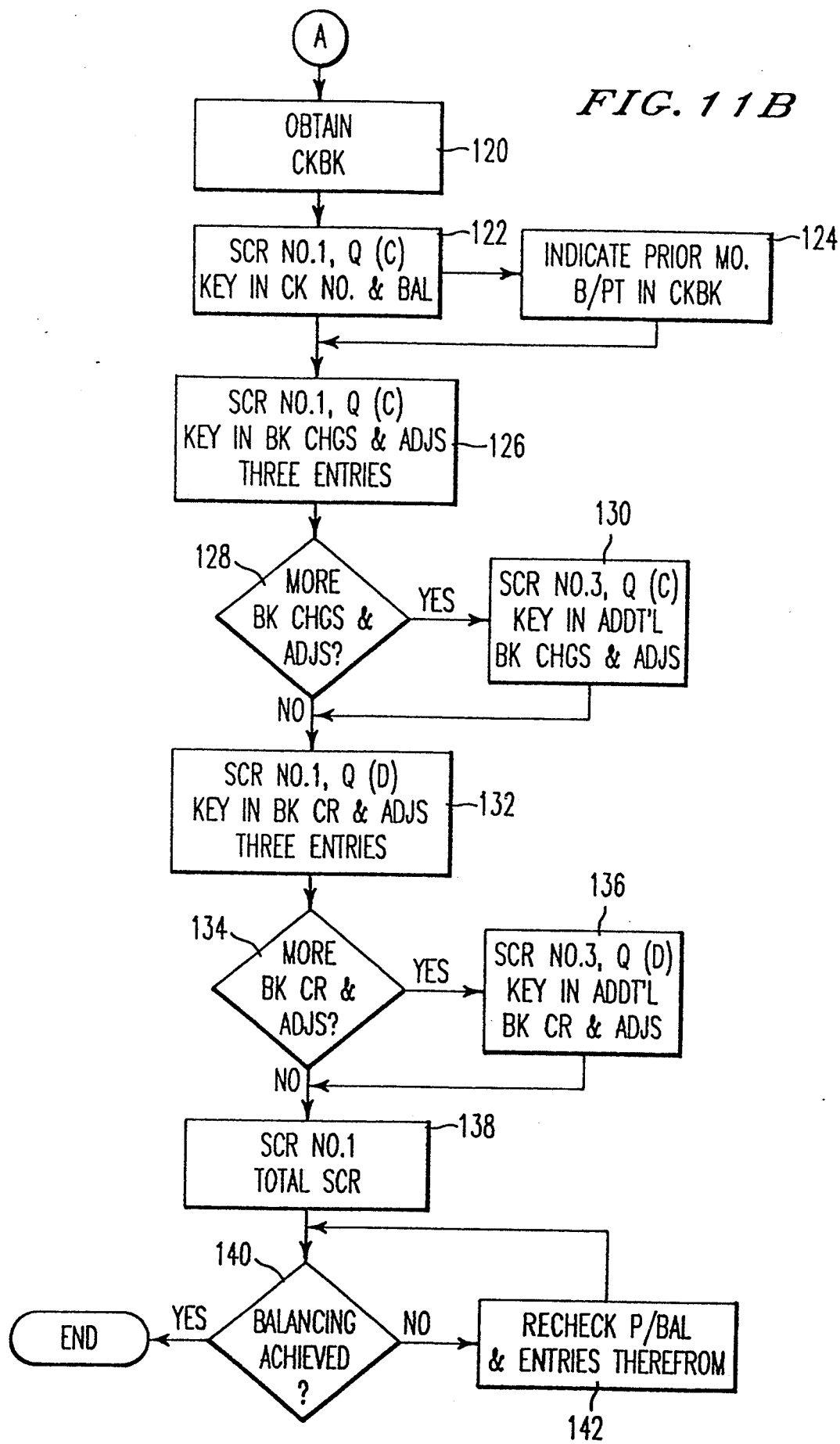

Next, detailed flow charts of the operation of the present invention, will now be explained with reference to FIGS. 11A–13B. FIGS. 11A and 11b illustrate the process of one-time only loading of the user's own prior month balancing. This is done only on initiating the system and is recommended so that the user may familiarize himself/herself with inputting data to the system and allowing the user to use the handheld computer exclusively for the first current month balancing. The alternative would be for the user to begin with the current month's balancing in FIGS. 12A–12D with the need to refer to an external prior balancing or balancing from scratch which could be more cumbersome due to old unpaid checks, unrecorded service charges from prior months, etc. which would have to be gleaned from the checkbook and prior bank statements. Once a current month balancing has been performed, it will be automatically transferred to prior month screens, numbers 1–3, thereby making room for a new current month balancing in screens numbered 4–6. In the examples shown in FIGS. 5–10, the time sequence is as follows: the present date is November and the user has received the bank statement for October. He has just completed the current balancing of October in screen numbers 4–6, FIGS. 8–10, while accessing data from the prior balancing in screens numbered 1–3, FIGS. 5–7. In December, when the November balancing will be due, he will move September data into storage by pressing the appropriate key or key sequence on the keyboard, and transfer October to screens 1–3, making room for the new current month in screens 4–6. This information can be retrieved for later reference by entering the appropriate key sequence.

The flow charts of FIGS. 11A–13B(2) contain abbreviations. A legend for these abbreviations is as follows:

| LEGEND: | | | |
|---|---|---|---|
| ADJ = | Adjustment | INCR = | Increase |
| BK = | Bank | MO = | Month |
| BAL = | Balance | O/DEP = | Outstanding |
| B/P = | Balancing | | Deposit |
| | Period | OV/PD = | Overpaid (by |
| B/PT = | Balancing Point | | bank) |
| CK = | Check | PD = | Paid |
| CKBK = | Checkbook | P/BAL = | Prior Month's |
| COR = | Correct | | Balancing |
| CR = | Credit | Q = | Quadrant |
| CHG = | Charge | REC/ITEM = | Reconciling |
| C/M = | Current Month | | item (in any |
| C/BAL = | Current | | of the 4 |
| | Month's | | quadrants) |
| DECR = | Decrease | SEQ/LST = | Sequential |
| DEP = | Deposit | | Listing |
| DIF = | Difference | | of paid checks |
| E/BAL = | Ending Balance | SCR = | Screen |
| E/DATE = | Ending Date | STMT = | Bank Statement |
| | | UNPD = | Unpaid |
| | | UN/PD = | Underpaid |
| | | | (by bank) |
| | | YR = | Year |

Turning now to the flow charts of FIGS. 11A and 11B which illustrate the process for loading the prior months balancing, in step 102, a user obtains the prior month's balancing or reconciliation from his records.

In step 104, the heading at the top of screen no. 1 (FIG. 5) is entered which shows the month and year of the prior balancing month. Then, in step 106, in screen no. 1, quadrant (A), the ending date of the statement and the bank balance for the prior month are entered.

Next, in step 108, up to three unpaid checks (i.e. checks issued but not appearing as paid on the bank statement) are entered in quadrant (A) of screen no. 1. Step 110 then asks if there are more than three unpaid checks; if there are, flow proceeds to step 112, where additional unpaid checks are keyed in on screen no. 2. Note: screen no. 2 and 5 are automatically totaled with the totals brought forward to basic screens no. 1 and 4, respectively, as part of quadrant (A). In proceeding from screen no. 1 to screen no. 2, a user can press a button on the keyboard which causes screen no. 2 to be displayed. Alternatively, the computer can automatically change to screen no. 2 when three unpaid checks have been entered in screen no. 1, which is screen no. 1's limit. After the additional unpaid checks have been entered in screen no. 2 and a total carried to screen no. 1, flow proceeds to step 114, where up to three outstanding deposits and adjustments are entered in screen no. 1, at quadrant (B). Like step 110 above, step 116 asks if there are more than three outstanding deposits and adjustments; if there are, flow proceeds to step 118 where at screen no. 3, for quadrant (B), the additional outstanding deposits and adjustments are entered. (Note: Screens no. 3 and 6, will automatically generate separate totals for each quadrant (B), (C), and (D) which will be carried back to their respective basic screens no. 1 and 4.) Flow then proceeds to process A, illustrated in FIG. 11B.

In FIG. 11B, in the initial step 120, the user obtains the checkbook used in making the reconciliation. Flows then proceeds to step 122 where in quadrant (C) of screen no. 1, the user enters the latest check number and balance used in his reconciliation. This establishes the balancing point of the prior reconciliation, which is indicated by a "BP" or other mark in the checkbook in step 124. Flow then proceeds to step 126, where at screen no. 1, quadrant (C), up to three bank charges and adjustments are keyed in. Step 128, then determines if there are more than three bank charges and adjustments; if so, flow proceeds to step 130, where in screen no. 3, for quadrant (C), additional bank charges and adjustments are entered.

At step 132, the user keys in up to three bank credits and adjustments in quadrant (D) of screen no. 1. Next, if at step 134, the user finds more than three bank credits or adjustments raising the checkbook balance, in step 136 he enters them in screen no. 3, for quadrant (D). As alluded to earlier, the optional screens 2, 3, 5, and 6 of the present invention can be automatically displayed if desired, or a user can manually select the screens by entering the appropriate keystroke(s). These screens are also automatically totaled by quadrant and the totals carried to their respective basic balancing screens, nos. 1 and 4.

In step 138, screen no. 1 is totaled. This total includes all entries made to actual screen no. 1, which is limited to three entries per quadrant for simplicity and clarity purposes, plus totals carried from screens no. 2 and 3, which are referenced in each quadrant of screen no. 1.

The flow then proceeds to step 140, which asks if balancing has been achieved, i.e. that the total of quadrants (A) and (B) equals the total of quadrants (C) and (D). As illustrated in FIG. 5, quadrants (A) and (B) represent the bank side of the balancing equation and quadrants (C) and (D) represent the checkbook side. If balancing has not been achieved, flow proceeds to step 142, which requires that the user recheck the accuracy of his/her reconciliation for the prior balancing month which was used as input to screens 1, 2, and 3, and the accuracy of the entries made therefrom. With step 142 accomplished properly, balancing will be achieved and the process will end. With the one-time entry of the user's prior balancing, the user may proceed to balance the current month using the process illustrated in FIGS. 12A–12D, in a more efficient manner. The efficiency will be achieved by: a) eliminating pencil and paper in most instances, b) eliminating the need to retrieve the prior month's bank statement and balancing (hard copy), and c) by reducing the number of reconciling items, particularly unpaid checks since balancing is made as of the last check paid by the bank, not month-end or even later as suggested by banks.

FIGS. 12A–12D illustrate the process used to balance the current month's entries of the checkbook. Again, if it is November and the October bank statement has just been received, the current month would be October, as shown in FIG. 8.

Figure 12A:
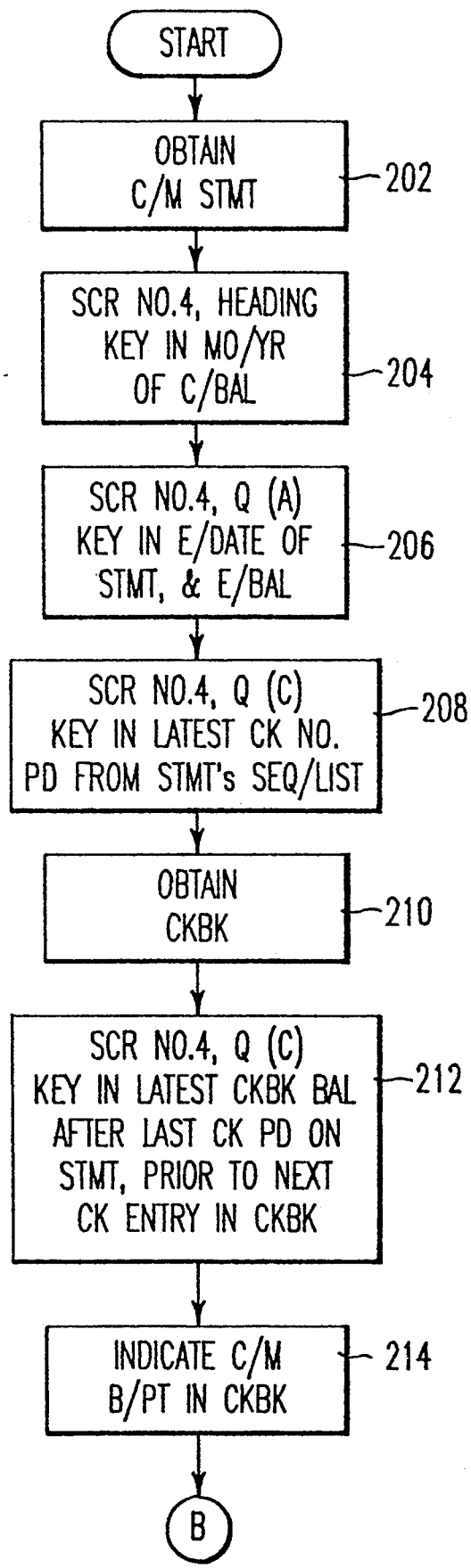
FIGS. 12A-12D illustrate a process used for balancing the current month's statement.

In FIG. 12A, step 202 requires a user of the system to obtain the current month's bank statement. Then, in step 204, the user keys in, at screen no. 4, the month and year of the current month's balancing into the heading portion of the screen. In step 206, the user keys in the ending date of the statement and the ending balance of the statement at the top of quadrant (A), screen no. 4. In step 208, the user keys in at screen no. 4, quadrant (C), the latest check number paid from the statement's sequential listing of paid checks.

Step 210 requires the user to obtain the checkbook. Then for step 212, in screen no. 4, quadrant (C), the user keys in the latest checkbook balance after the last check paid on the statement, prior to the next check entry in the checkbook, as previously described with respect to the balancing point. Then, in step 214, the user marks the current month's balancing point in the checkbook. Flow then proceeds to process B illustrated in FIG. 12B.

Figure 12B:
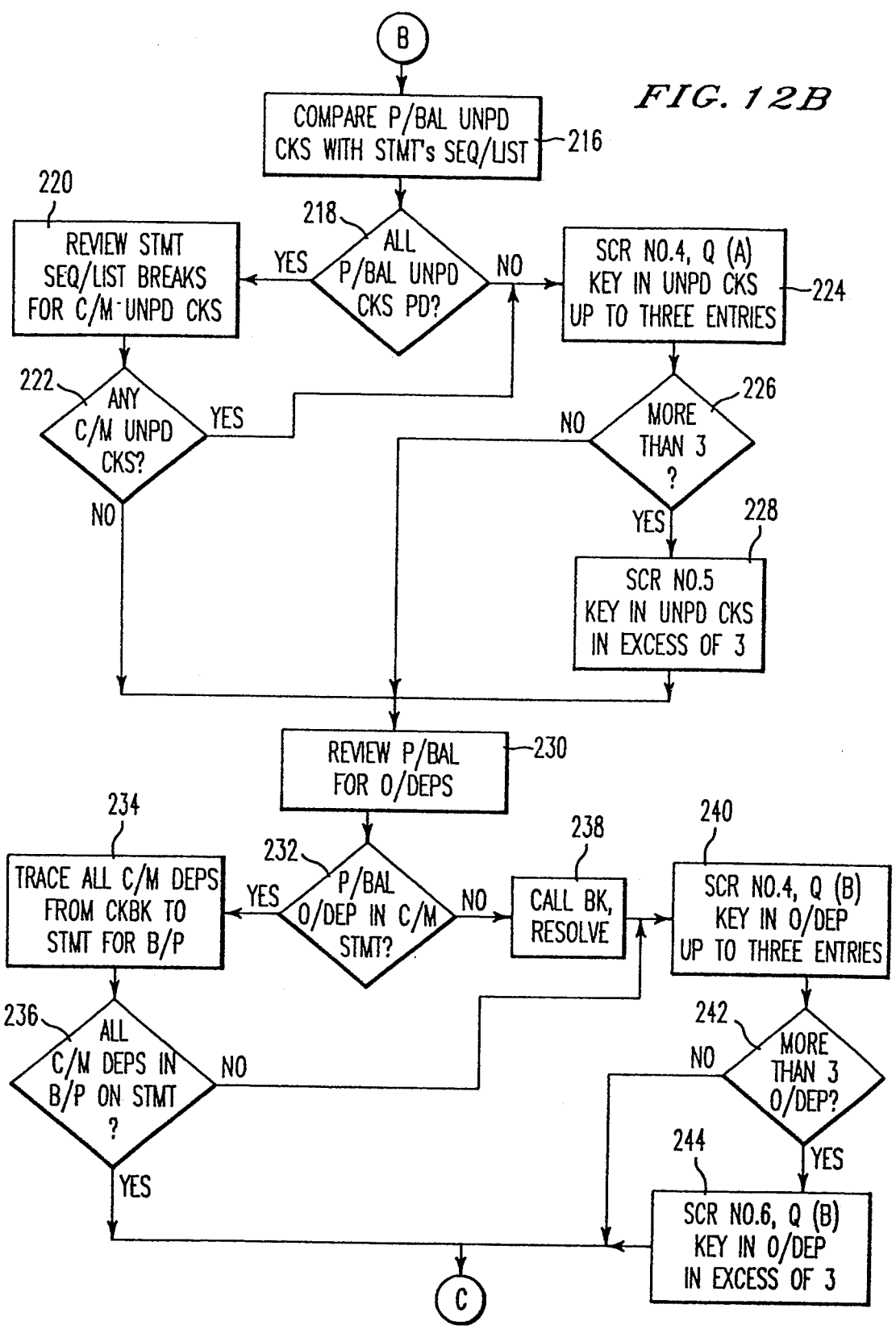

In FIG. 12B, steps 216–228 of the flowchart take care of unpaid checks. The user compares the prior month's balancing unpaid checks to the statement's sequential list of paid checks in step 216. Step 218 determines if all of the prior month's unpaid checks have been paid. If they have been paid, flow proceeds to step 220 where the user reviews the current month's sequential list of checks for breaks, indicating possible unpaid checks. If step 222 determines that there are any current month unpaid checks, flow proceeds to step 224. In step 224, all unpaid checks are entered including checks from the current month and prior month. Step 224 allows up to three of these unpaid checks to be entered in quadrant (A) of screen no. 4. If there are more than three unpaid checks, flow proceeds from step 226 to step 228 where at screen no. 5, the user keys in the unpaid checks which are in excess of three.

Next, a process for outstanding deposits illustrated in steps 230–244 is performed in a similar manner to the steps 216–228 for the unpaid checks. In step 230, the user reviews the prior balancing for outstanding deposits. Step 232 determines whether all outstanding deposits from the prior month are in the current month's statement. If one or more is missing flow proceeds to step 238 where a user will call the bank to resolve the problem as a deposit should not be outstanding for a period of one month. If in step 232, the answer is yes, there are no problems with outstanding deposits from the prior month. Flow proceeds to step 234 where a user examines all of the current month's deposit to ensure that they appear on the bank statement. Step 236 determines if all of the current month's deposits appear on the bank statement and if they are on the current month's statement (e.g. no outstanding deposits), flow proceeds to process C illustrated in FIG. 12C.

If for any reason, there are deposits recorded in the checkbook for the balancing period but not on the bank statement, each of these deposits must be entered in quadrant B of screen no. 4 at step 240. Step 240 permits the entries of three of these outstanding deposits and if there are more than three outstanding deposits, flow proceeds from step 242 to step 244 where in screen no. 6, for quadrant B, the outstanding deposits in excess of three are keyed in. Next, flow proceeds to process C illustrated in FIG. 12C.

Figure 12C:
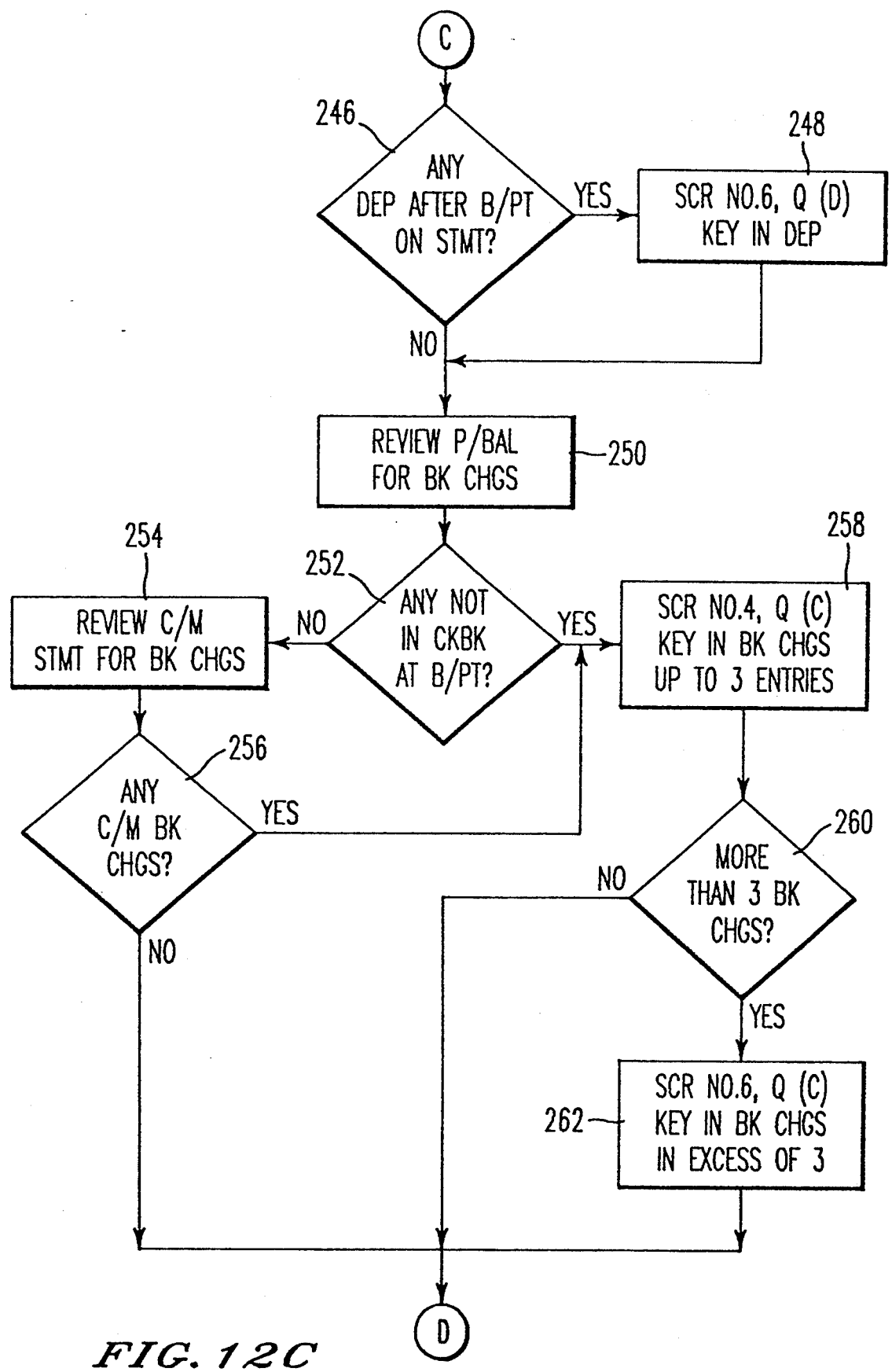

In FIG. 12C, step 246 examines if there are any deposits which occurred after the checkbook's balancing point on the bank statement. If there are, these deposits occurring after the balancing point are keyed in under step 248 at screen no. 6 for entries pertaining to quadrant (D). These entries are adjustments equating the checkbook with the bank statement and are for balancing purposes only.

Next, steps 250-262 handle the processing required for bank charges. In step 250, the user reviews the prior month's balancing for bank charges. If there are bank charges from the prior month that have not been entered in the checkbook as of the balancing point, flow proceeds to step 258 where bank charges are entered. If there are not any unrecorded bank charges from the prior month's balancing, flow proceeds to step 254 where the user reviews the current month's bank statement for any bank charges. If the user finds current month bank charges which are not entered in the checkbook as of the balancing point, flow proceeds to step 258, where at screen no. 4, quadrant (C), up to three bank charges for both the prior and current months are entered. If step 260 determines there are more than three bank charges, the user keys in the excess of these three bank charges at screen no. 6, pertaining to quadrant (C). Flow then proceeds to process D illustrated in FIG. 12D.

Figure 12D:
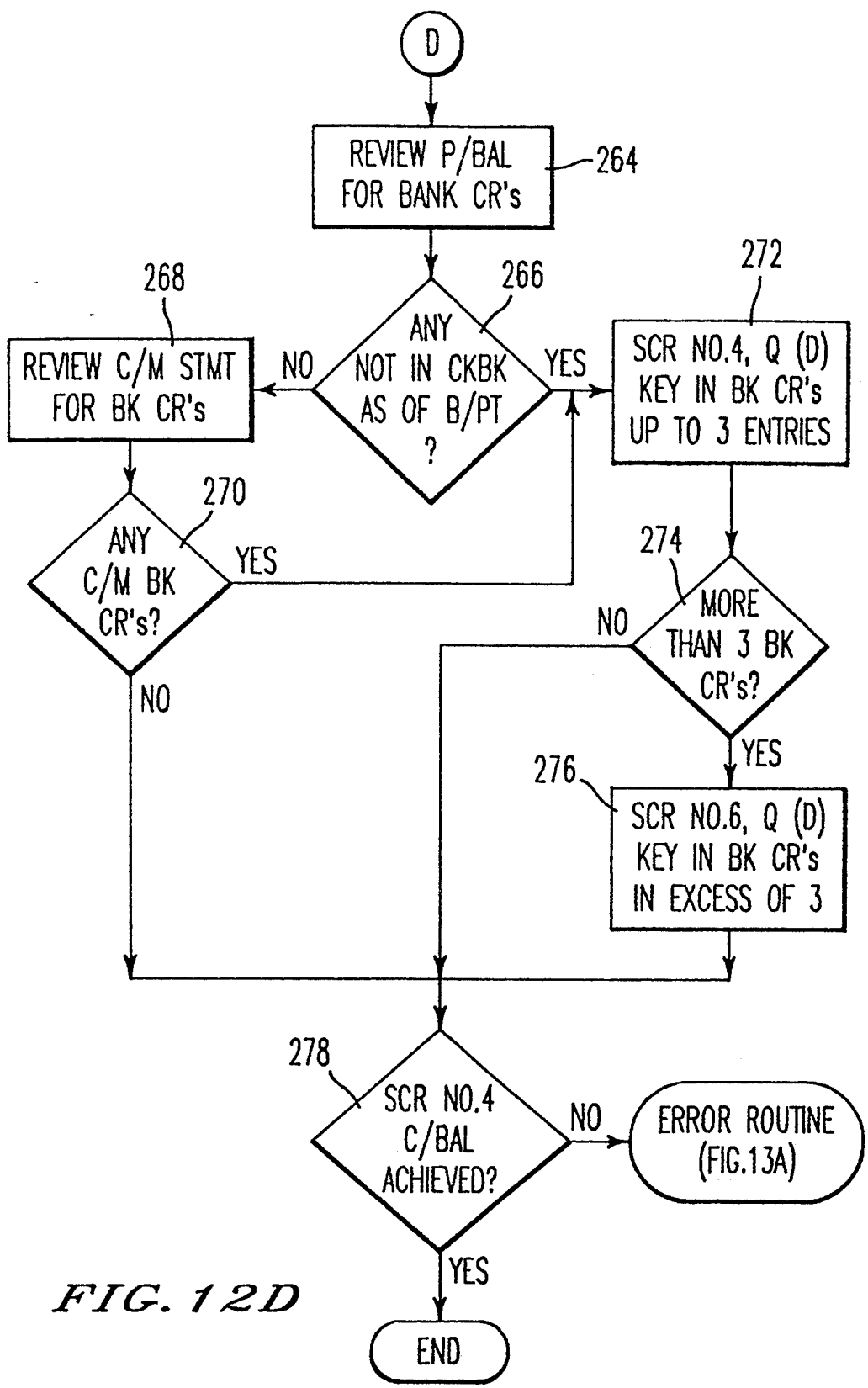

In FIG. 12D, steps 264-276 take into account bank credits for such items as interest, transfers, and bank errors. In step 264 the user reviews the prior month's balancing for bank credits. If there are prior month bank credits which are not in the checkbook as of the balancing point, flow proceeds from step 266 to step 272 where both the prior and current month's credits are entered into screen no. 4, pertaining to quadrant (D). If step 266 determines that all prior month's bank credits have been recorded in the checkbook as of the balancing point, flow proceeds to step 268 where the user reviews the current month's statement for bank credits. If step 270 determines that there are current month's bank credits which are not in the checkbook as of the balancing point, flow proceeds to step 272 where up to three entries pertaining to the bank credits are entered into the system at quadrant D of screen no. 4. If step 274 determines there are more than three entries, flow proceeds to step 276 where at screen no. 6, quadrant (D), the bank credits in excess of three are entered.

Flow then proceeds to step 278 where at screen no. 4, the actual bank balance and the actual checkbook balance are compared to see if they are equal to each other. If they are equal, balancing has been achieved, and the process ends. If they are not equal, an error has occurred and the error routine illustrated in FIGS. 13A, 13B(1) and 13B (2) is called upon.

Figure 13A:
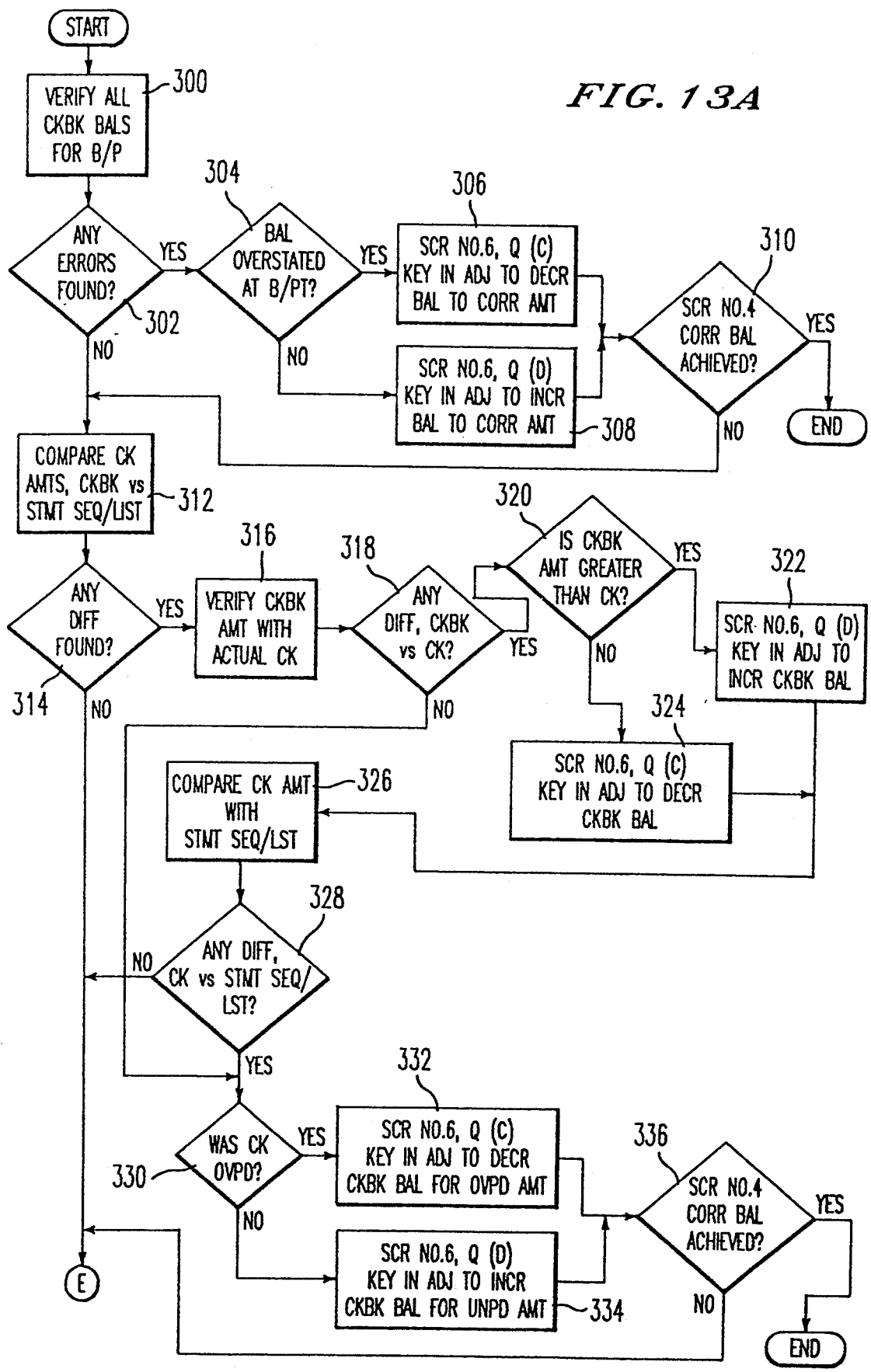

FIGS. 13A, 13B(1) and 13B(2) illustrate the steps which can be used in determining why the actual bank balance is not equal to the actual checkbook balance. Steps 300-310 of FIGS. 13A illustrate the process used to determine and correct common mathematical errors which have been made in the checkbook.

Step 300 requires a user to verify all checkbook balances for the current balancing period; i.e. from the prior balancing point, all check deductions, deposit additions, and other additions/subtractions will be checked and balances verified to the current balancing point. If any errors are found, flow proceeds from step 302 to 304 where it is examined if there was an understatement or overstatement. If there was an overstatement, in step 306, an adjustment is keyed into quadrant (C) of screen no. 6 to decrease the balance to the correct amount. If there was an understatement, in quadrant (D) of screen no. 6, the user keys in the adjustment to increase the balance to the correct amount in step 308. Step 310 examines if proper balancing has been achieved, and if it has, at this point the correction process ends. If it has not, flow proceeds to step 312.

Steps 312-336 handle recording errors which occur in entering check amounts in the checkbook, as well as bank over/under payments of checks. The process begins in step 312, with comparison of check amounts recorded in the checkbook to check amounts paid in the bank statement's sequential list of paid checks. If a difference is found in step 314, between an amount in the checkbook and an amount in the statement's listing, flow proceeds to step 316, where the user compares the checkbook amount to the actual paid check returned by the bank. If there is a difference between the checkbook amount and the amount of the actual check in step 318, flow proceeds to step 320, to determine if the checkbook amount is greater than the amount of the check. If it is, flow proceeds to step 322, where the user, at quadrant (D) of screen number 6, keys in the adjustment to increase the checkbook balance. If the amount is determined to be less in step 320, flow proceeds to step 324, where the user keys in for quadrant (C) at screen number 6, the adjustment necessary to decrease the checkbook balance.

While step 324 completes the process for correcting check recording errors in the checkbook, there still may be an over/under payment by the bank on such a check. Thus, flow proceeds from step 322 or 324 to step 326, which asks the user to compare the amount of the actual check to the amount paid in the statement's list of paid checks. If no difference is found in step 328, flow proceeds to process E of FIG. 13B(1). If a difference is noted, flow proceeds to step 330, which determines whether an overpayment or underpayment occurred. It should be noted that at step 318, if no difference was found between the amount recorded in the checkbook and amount of the actual check, flow proceeds directly to step 330, since an incorrect payment by the bank is certain due to prior comparison in step 312 of the checkbook amount with the amount in the statement's listing of paid checks.

Step 330, determines if an overpayment occurred; if yes, in step 332 quadrant (C) of screen number 6 is keyed with an adjustment to decrease the checkbook balance for the overpaid amount. If no, in step 334, the underpaid amount is keyed in to quadrant (D) of screen number 6 as an adjustment to increase the checkbook balance. Of course, if these adjustments were of significant amounts the user would have cause to contact his bank. Both steps 332 and 334 flow to step 336, where at screen number 4, it is determined whether balancing has been achieved. If it has, the process ends. If not, flow proceeds to process E illustrated in FIG. 13B(1) for additional steps to determine the source of the error(s).

In process E, at step 338, the user traces all prior month's balancing reconciliation items to the current month's statement, the checkbook or the current month's balancing. If any items are not determined to be verified in step 340, flow proceeds to step 342 where at screen no. 5 or 6, at quadrant (A), (B), (C), or (D), the user keys in the item as a reconciling item. If the current bank balance and the current checkbook balance are determined to be the same in step 344, the error routine ends. If they are not the same, flow proceeds to step 346.

In step 346, the user traces and marks all statement items to the checkbook, current month reconciling items, or prior month's reconciling items. Then in step 348, the user traces unmarked checkbook entries to determine that they are included in the current month's reconciling items or represent an item from the prior month's balancing. If step 350 determines that any item is not verified, flow proceeds to step 352 where at screen no. 5 or 6, for any of the four quadrants (A)–(D), the user keys in the item in the appropriate quadrant as a reconciling item. Step 354 then examines whether balancing has been achieved and if it has, the error routine ends. If the checkbook has not been balanced, flow proceeds to step 356.

Step 356 examines whether any checks were cancelled or voided in the balancing period. If there were, step 358 examines whether the check amount was added back to the checkbook balance as of the balancing point. If it was not, for step 360 at screen no. 4 or 6 for quadrant (D), the user keys in the adjustment for the cancelled check which adds back the amount of the check to the checkbook balance. If this check was not included in unpaid checks as determined in step 362, flow proceeds from step 362 to step 366. If in step 362 it was found that this check was included in the unpaid checks, flow proceeds to step 364 where the user, for screens no. 4 or 5, for quadrant (A), deletes the cancelled check from the unpaid check list and flow proceeds to step 366. If in step 366, the checkbook has been balanced, the error routine ends. If the checkbook still does not balance, the error has not been found and the error routine illustrated in FIGS. 13A and 13B must be repeated.

This system allows for checkbook balancing at an optimum point prior to the "current balance" suggested in bank instructions. This is made possible by the checkbook side of the balancing equation shown in FIG. 3, i.e., quadrants (C) and (D), which bank instructions do not have and which materially streamlines the process.

For example, under the bank method, the user would have to update his/her checkbook for bank charges and credits upon receipt of the bank statement in order to have a reconcilable balance at the current balance.

Then, the user would have to carry as reconciling items all checks, deposits and other entries affecting the balance as of the current checkbook balance, to balance with the monthend statement. Under optimum conditions, with balancing at 10 days after the ending date of the bank statement, the reconciling items would be 10 days worth of checkbook transactions. However, if balancing slipped to 25 days it would be that many transactions. Balancing after one month would pose a real problem since bank instructions imply a continuum, i.e., reconciling to the current balance whenever the balancing is actually done.

Under the present invention the user has minimum reconciling items at any balancing. At a balancing 10 days after receipt of the bank statement, he/she is spared all checks, deposits and other transactions for the 10 day period, and will record the bank charges/credits after balancing from the checkbook side of the balancing equation. Additionally, delays in balancing do not pose a "continuum" problem since each month's statement can be reconciled to a commensurate date in the checkbook prior to the current balance with a minimum of reconciling items.

The system also adds flexibility and improved control to the checkbook balancing process over that of bank instructions. Suppose, for example, that the user wanted to balance as of his latest checkbook balance, but did not wish to update the existing checkbook balance for bank charges/credits shown on the bank statement before making the balancing. This could be done by using the existing latest checkbook balance as the balancing point, and including the statement charges/credits as reconciling items in the checkbook side of the balancing equation as shown in FIG. 3. Once balanced, the user could enter them to the actual checkbook. This also includes the benefit of improved control since any imbalance is isolated to the latest checkbook balance before entering bank charges/credits which is not the case available in bank instructions. Additionally, for multi-month balancings with each balancing point at an optimum checkbook balance commensurate with each bank statement, the user has improved control in isolating errors for a given month. This improves control for a circumstance not contemplated in bank instructions. Bank instructions assume that all balancings will be made timely, and that each balancing is a continuum to the current (latest) checkbook balance.

Obviously, numerous modifications and variations of the present invention are possible in light of the above teachings. It is therefore to be understood that within the scope of the appended claims, the invention may be practiced otherwise than as specifically described herein.

For example, the arrangement of the quadrants can be changed as long as the same basic information is input and displayed. Further, to reconcile the checkbook, certain numbers are taken into account on the bank side of the display and certain numbers are taken into account on the checkbook side of the display. An equivalent of the present invention could have the numbers taken into account on reverse sides of the display as long as the mathematical operations are also changed (e.g., add instead of subtract and subtract instead of add).

Below is a list of terms, with definitions, which are used in the present writing which would be helpful to a reader who is not familiar with the terms of art which have been used.

| Term | Definition |
|---|---|
| Adjustment | An entry in the checkbook, bank statement, or balancing equation which corrects a prior error or aligns the checkbook balance with the bank statement in the balancing. |
| ATM | Automated teller machine, for which use banks make charges in certain situations |
| Balancing, checkbood | Also called a bank reconciliation; an agreement between the checkbook and bank statement at a given point in time. |
| Balancing equation | An equation containing a bank balance side and a checkbook balance side with reconciling entries on each side to arrive at the actual cash balance available. Each side with its reconciling entries is represented by two quadrants. |
| Balancing current | Refers to the current month's balancing. |
| Balancing period | Covers all checkbook transactions from the prior balancing point to the current balancing point. |
| Balancing point | A specific checkbook balance on a given data at which the checkbook is balanced to the bank statement balance. The date may or may not coincide with the bank statement date. |
| Balancing, prior | Refers to the prior month's balancing. |
| Bank charge | Refers to any of several types of charges made on the bank statement for services to the account. These are shown as debits usually in the checks column of the statement and reduce the account balance. |
| Bank credit | Refers to several types of credits to the account, i.e., for interest, correction, or other reason. These are usually shown in the deposits column of the bank statement and increase the account balance. |
| Cancelled/ voided check | A check that will not be paid, and if deducted from the checkbook balance, the amount should be added back. |
| Outstanding deposit | Refers to a deposit which was made or sent to the bank, but is not reflected on the bank statement to be balanced. |
| Overpayment check | A bank error in payment of a check for more than the amount written. This will require a reconciling item in balancing the checkbook. |
| Quadrant | Refers to any of the four quadrants used in the balancing equation and shown in the basic balancing screens of this booklet and on the computer. |
| Reconciling item | An item needed to balance, either on the bank side or checkbook side of the balancing equation, because the amount is represented in one balance (checkbook or bank statement) but not the other, i.e., a bank service charge, an unpaid check, etc. |
| Screen, computer | The visible picture or diagram that appears on a computer monitor for the purpose of advising or prompting the entry of data to produce a result. |
| Screen, basic balancing | The basic screen for accomplishing the checkbook balancing. The system has one for the prior balancing and one for the current balancing. |
| Screen, optional | A supporting screen to a basic balancing screen, carrying its total/s to the basic screen. It is used only when the basic screen cannot accommodate all reconciling items. |
| Storage, computer | The ability of the computer to store data, i.e., prior month balancings for reference. |
| Underpayment, check | A bank error in payment of a check for less than the amount written. This will require a reconciling item in balancing the checkbook. |
| Unpaid check | A check issued, but not yet shown as paid on the current or prior bank statements. |
| Update, checkbook | To record the checkbook with current data, as in recording bank service charges as soon as the checkbook has been balanced. |

What is claimed as new and desired to be secured by Letters Patent of the United States is:

1. A computer for inputting, calculating and displaying information used to reconcile a checkbook with a bank statement, comprising:
   a bus;
   a keyboard, connected to the bus;
   a display, connected to the bus, having four quadrants;
   first means for inputting into the display, a balance on the bank statement;
   second means for inputting onto the display, a balance on the checkbook;
   means for inputting onto a first quadrant of the display unpaid checks;
   means for inputting onto a second quadrant of the display, outstanding deposits;
   means for inputting onto a third quadrant of the display, bank charges not appearing in the checkbook;
   means for inputting onto a fourth quadrant of the display, bank credits not appearing in the checkbook;
   a first calculation means, connected to the bus, for calculating an actual bank balance by subtracting from the balance on the bank statement, the unpaid checks, and adding thereto, the outstanding deposits; and
   second calculation means, connected to the bus, for calculating an actual checkbook balance by subtracting from the balance in the checkbook input, the bank charges and adding thereto, the bank credits;
   wherein said first means for inputting onto the display, said second means for inputting onto the display, said means for inputting onto a first quadrant, said means for inputting onto a second quadrant, said means for inputting onto a third quadrant, and said means for inputting onto a fourth quadrant input only unpaid checks, outstanding deposits, bank charges not appearing in the checkbook, bank credits not appearing in the checkbook, a balance on the bank statement and a balance on the checkbook and are exclusive means for inputting transactions and dollar amounts which appear in said checkbook and said bank statement.

2. A computer according to claim 1, wherein said computer is a handheld computer.

3. A computer according to claim 1, wherein the second means for inputting a balance of the checkbook on the display inputs a balance in the checkbook which is an entry in the checkbook before a next check after a last check which was paid on the bank statement.

4. A computer for inputting, calculating and displaying information used to reconcile a checkbook with a bank statement, comprising:
   a bus;
   a keyboard, connected to the bus;
   a display connected to the bus;
   input means, connected to the bus, for inputting only unpaid checks, outstanding deposits, bank charges not appearing in the checkbook, bank credits not appearing in the checkbook, a balance on the bank statement and a balance on the checkbook;
   a display connected to the bus;
   a first calculation means, connected to the bus, for calculating an actual bank balance by subtracting from the balance on the bank statement, the unpaid checks, and adding thereto, the outstanding deposits;

second calculation means, connected to the bus, for calculating an actual checkbook balance by subtracting from the balance in the checkbook input, the bank charges and adding thereto, the bank credits.

5. A computer according to claim 4, wherein said computer is a handheld computer.

6. A computer for inputting, calculating and displaying information used to reconcile a checkbook with a bank statement, comprising:

a bus;

a keyboard, connected to the bus;

a display connected to the bus;

input means, connected to the bus, for inputting only unpaid checks, outstanding deposits, bank charges not appearing in the checkbook, bank credits not appearing in the checkbook, a balance on the bank statement and a balance on the checkbook;

a display connected to the bus;

means for generating, on the display, an image which contains two halves, a first of said halves for displaying information in the checkbook which does not appear on the bank statement, and a second of said halves for displaying information appearing on the bank statement but not in the checkbook;

wherein the means for generating further generates an image containing unpaid checks in the first half, an image containing the outstanding deposits the first half, an image containing the bank charges in the second half, and an image containing the bank credits in the second half;

a first calculation means, connected to the bus, for calculating an actual bank balance by subtracting from the balance on the bank statement, the unpaid checks, and adding thereto, the outstanding deposits;

second calculation means, connected to the bus, for calculating an actual checkbook balance by subtracting from the balance in the checkbook input, the bank charges and adding thereto, the bank credits.

7. A computer according to claim 6, wherein the display contains four quadrants, the first and second quadrants are in the first half and the third and fourth quadrants are in the second half; and said means for generating generates an image in the first quadrant containing the checks input by the first input means, an image containing the deposits input by the second input means in the second quadrant, an image containing the bank charges input by the third input means in the third quadrant, and an image containing the bank credits input by the fourth input means in the fourth quadrant.

8. A computer according to claim 7, wherein said computer is a handheld computer.

9. A computer according to claim 6, wherein said computer is a handheld computer.

* * * * *